United States Patent [19]
Deshoux et al.

[11] Patent Number: 6,129,552
[45] Date of Patent: Oct. 10, 2000

[54] TEACHING INSTALLATION FOR LEARNING AND PRACTICING THE USE OF FIRE-FIGHTING EQUIPMENT

[75] Inventors: Thierry Deshoux, Herbignac; Jacques Jaunasse, Nivillac; Marcel Seignard, Arzal, all of France

[73] Assignee: Technique-Pedagogie-Securite Equipements, France

[21] Appl. No.: 09/011,090

[22] PCT Filed: Jul. 19, 1996

[86] PCT No.: PCT/FR96/01138

§ 371 Date: Aug. 3, 1998

§ 102(e) Date: Aug. 3, 1998

[87] PCT Pub. No.: WO97/04432

PCT Pub. Date: Feb. 6, 1997

[51] Int. Cl.[7] .................................................. G09B 19/00
[52] U.S. Cl. ............................................................ 434/226
[58] Field of Search ................................... 434/226, 219

[56] References Cited

U.S. PATENT DOCUMENTS

| | | | |
|---|---|---|---|
| 4,001,949 | 1/1977 | Francis | 434/226 |
| 4,526,548 | 7/1985 | Livingston | 434/226 |
| 4,742,356 | 5/1988 | Kuipers | 342/448 |
| 4,861,270 | 8/1989 | Ernst et al. | 434/226 |
| 4,948,371 | 8/1990 | Hall | 434/21 |
| 5,059,124 | 10/1991 | Tsujita | 434/226 |
| 5,316,484 | 5/1994 | Layton | 434/226 |
| 5,374,191 | 12/1994 | Herman | 434/226 |
| 5,518,402 | 5/1996 | Tommarello | 434/226 |
| 5,823,784 | 10/1998 | Lane | 434/226 |

FOREIGN PATENT DOCUMENTS

| | | | |
|---|---|---|---|
| 2310602 | 5/1976 | France | G09B 9/00 |
| 2714197 | 12/1993 | France | G09B 9/00 |

*Primary Examiner*—Kien T. Nguyen
*Assistant Examiner*—Kurt Fernstrom
*Attorney, Agent, or Firm*—Blakley Sokoloff Taylor & Zafman

[57] ABSTRACT

The installation comprises a screen (1) of large size on which varying images are displayed representing a fire in a sequence under the control of a computer (9), the person (P) performing the exercise having available modified fire extinguisher devices (4) delivering a virtual jet whose point of impact on the screen (1) can be located, with corresponding information being transmitted to the computer (9). The person also has available associated devices (8) representing "influential" means liable to have an influence on the behavior of the fire, with handling thereof also causing information to be generated that is understood by the computer, and that is taken into account to cause the images displayed on the screen to vary accordingly. Equipment for fire-fighting, training and practice.

7 Claims, 6 Drawing Sheets

FIG_3

FIG_4

VIDEO CLIP SEQUENCE SUMMARY

FIG_8

VIDEO CLIPSCRIPT

TEACHING INSTALLATION FOR LEARNING AND PRACTICING THE USE OF FIRE-FIGHTING EQUIPMENT

BACKGROUND OF THE INVENTION

1. Field of the Invention

The present invention relates to a teaching installation enabling people to learn and practice the use of fire-fighting equipment.

2. Background Information

Installations for simulating fires have already been proposed.

Thus, document EP-B-0 146 465 relates to a movable installation (mounted on a truck) including an exercise box in which there are to be found means capable of putting the people to be trained or given practice under real conditions of performance. Those means consist in particular of pipework including vessels containing flammable fuel, a flammable gas burner, and an electrical cabinet suitable for being set on fire. The installation is fitted with a control and observation room.

That kind of installation gives complete satisfaction, both for training people to become specialists and for giving practice to people who have already been trained, for example professional firemen, since it reproduces fire hazard conditions that are very close to real conditions.

However, it is designed for actions that require the use of major fire-fighting equipment, and not specifically for training people in the use of fire extinguishers in the context of a fire that is just beginning.

Proposals have also been made for simulator systems that do not implement real fires, but that show previously-filmed scenes of fires in the forms of images projected onto a screen to be found in front of the person who is to be trained or given practice.

One such system is known from document FR-A-2 310 602, for example.

Images are projected onto the screen by a cinema projector, and means driven by an electronic computer make it possible, to some extent to cause the fire scene to vary.

The person participating in the exercise is given a carbon dioxide ($CO_2$) extinguisher, and projects real carbon dioxide onto the images, i.e. onto the screen. The screen is fitted with a set of sensors which, as a function of the screen tension, make it possible to locate the impact zone of the $CO_2$ on the screen, and to deliver corresponding information to the computer which then modifies the way in which the fire images visible on the screen vary, assuming that the way in which the person handles the fire extinguisher does not comply with a predetermined sequence.

That known system which already provides a degree of interaction between the behavior of the person responsible for extinguishing the fire and the way in which the behavior of the fire varies suffers from the drawback of using up carbon dioxide, and of requiring means for storing and supplying said gas.

Another drawback of that known system results from the fact that the message given by the sensor is a function of screen tension, which is rather imprecise since it depends not only on the position of the point of impact, but also on the distance between the operator and the screen; it is therefore not possible to locate the zone of impact accurately and reliably.

Finally, projecting cinema images cannot provide interactivity that is real and complete, nor can it respond in a manner that is rapid and with multiple different variations in the fire scenes that are projected.

Document U.S. Pat. No. 5,059,124 relates to simulation apparatus for practice in fire-fighting.

That apparatus includes a TV monitor (television screen) associated with a computer adapted to display on the screen images representing a fire. The person performing the exercise is given a dummy (modified) fire extinguisher that emits an infrared ray representing the direction of the virtual jet from the device; sensors located at the periphery of the screen are adapted to locate the impact zone. Ultrasonic detection means also serve to determine the distance between the screen and the nozzle of the modified fire extinguisher. This information is transmitted to the computer which causes the images of the fire to vary accordingly. Thus, if the fire extinguisher is handled properly, the fire will go out. Otherwise, if it is handled wrongly, then the fire will continue, and may be get worse.

That known apparatus suffers from two major drawbacks.

Firstly, the screen is small in size, given that it is a screen of the CRT type. It is therefore not possible to display an ordinary fire thereon at life size, such that the amplitudes of the movements and the handling operations that the person needs to perform are quite wrong, and thus not representative of a real situation.

Secondly, the only action that the user needs to perform is to make use of a fire extinguisher. No broader behavior is required of the user, and as a result the applicability of that known apparatus is relatively limited from an educational point of view.

In this respect, it should be observed that when confronted with a fire that is just starting, it is often essential to take certain prior precautions even before using a fire extinguisher on the fire itself. Thus, for example, if the fire is in an electrical cabinet, the first thing to be done is to disconnect the electricity supply.

Otherwise, the procedure for extinguishing the fire will be ineffective.

SUMMARY OF THE INVENTION

Like the apparatus described in document U.S. Pat. No. 5,059,124, the installation of the present invention comprises:

a screen in front of which the person performing the exercise is to be located;

means for displaying on the screen varying images that represent a fire in a sequence that is driven by a computer;

at least one modified fire extinguisher device that is incapable of propelling a fire-extinguishing agent, but that is fitted with means for generating a signal representing the direction of its virtual jet; and means for locating the virtual zone of impact of the device on the screen, and adapted to transmit corresponding information to the computer so as to cause the displayed images to vary accordingly.

According to the invention:

a) firstly said screen is of large dimensions, such that the images displayed thereon are at the same scale or at substantially the same scale as real fire scenes they represent; and b) secondly, the installation includes:

at least one associated device representing "influential" means that can be put into at least two different states, and for which a change of state can have an influence on the progress of the fire, said associated device also being adapted to be actuated by the person performing the exercise, means for detecting the state of said associated device being provided and adapted to transmit corresponding information to the computer so as to cause the displayed images to vary accordingly, where appropriate; and a plurality of modified fire extinguisher devices of different types, suitable for being taken selectively by the person, contactors associated with each of said devices being adapted to supply the computer with information concerning the identity and the state of the device that has been taken.

For the operation to run properly, it is essential for the type of fire extinguisher (i.e. the kind of fire-extinguishing agent it is supposed to be applying) should be adapted to the type of fire in question.

By means of these dispositions, the drawbacks mentioned above are eliminated.

Also, in accordance with a certain number of possible advantageous but non-limiting characteristics of the invention:

the installation includes a video projector driven by the computer and projecting images on the screen; and the surface of the screen is translucent, said video projector being placed behind the screen, and operating by back projection.

In a preferred embodiment, the impact zone is located by an electromagnetic detection system, the modified fire extinguisher device being fitted with emitting cells located on the aiming axis of the device, while fixed magnetic field sensors are distributed in the exercise zone, said system detecting both the distance and the angle of attack of the fire extinguisher device relative to the screen.

The distance and the orientation of the jet are parameters that are of great importance concerning the effectiveness of the action taken.

In another possible embodiment, the impact zone is located by means of a light beam, e.g. an infrared beam, emitted by a laser pointer fitted to the modified fire extinguisher device, and by means of an optical sensor suitable for locating the impact zone of the beam on the surface of the screen.

In which case, preferably, said laser pointer emits an intermittent beam in the form of pulses, the optical sensor being adapted to analyze the duration of said pulses, and to transmit corresponding information to the computer.

Advantageously, said associated device represents "influential" means selected from the following:

an alarm;
a glass breaker;
a telephone;
an electrical control panel;
a gas meter;
an oxygen cutoff handle;
a machine switchoff handle;
an electricity outlet;
an extinguishing gas control;
a trapdoor-pull device.

Finally, and preferably, the installation includes means for generating flashes of light, sounds, cold smoke, and/or odors, optionally under the control of the computer.

Other characteristics and advantages of the invention appear from the following description and the accompanying drawings, which show possible embodiments of the installation.

DETAILED DESCRIPTION OF THE INVENTION

Figure 1:
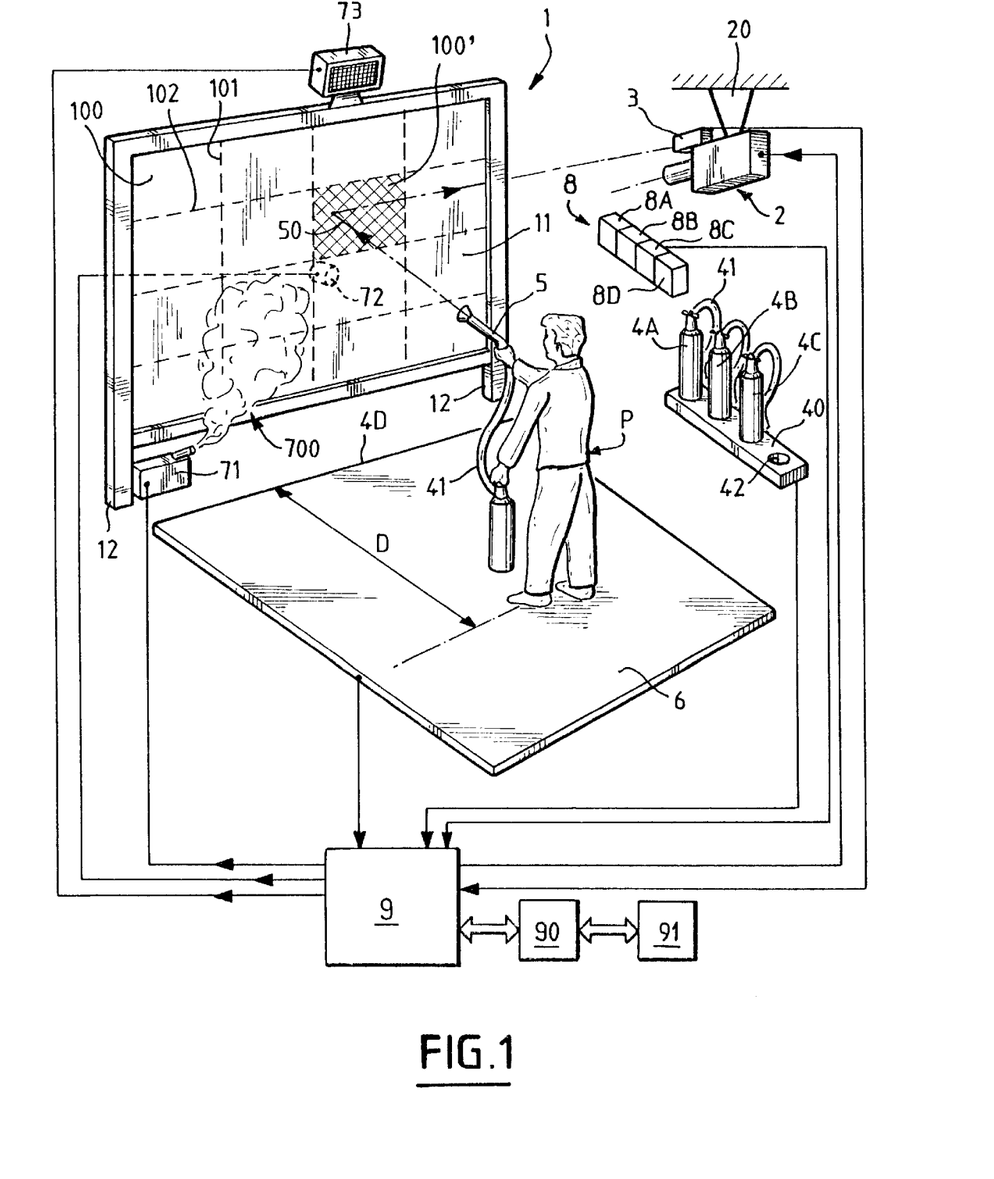
FIG. 1 is an overall perspective view of a first embodiment.

FIG. 1 is an overall diagram of an installation during an exercise for training or giving practice to a person referenced P.

The system comprises a large screen 1 extending vertically, made up of a rectangular frame 10, a tensioned sheet 11 suitable for displaying projected images, and legs 12 for supporting the screen or for fixing it to the ground.

As an indication, the sides of the screen may be of dimensions of the order of 1.5 meters (m) to 3 m, or even greater.

In front of the screen, there is a projector 2 carried by an appropriate support 20, e.g. fixed to the ceiling.

The projector is a known type of video projector, e.g. of the type DP 2800 or PRAO BROADCAST from INTELWARE, which provides analog type projection with excellent image quality.

A sensor 3 is mounted on the projector 2 and serves, as explained in greater detail below, to detect the position of an infrared point on the screen.

In front of the screen 1, on one of the sides thereof, there is disposed a stand 40 having a series of housings 42 in which it is possible to install in removable manner a series of instrumented fire extinguishers, referred to in the present description and in the claims thereafter as "fire-fighting devices".

By way of example, there may be four of them, referenced 4A, 4B, 4C, and 4D.

The first three are in position on the stand, while the last, 4D, has been taken out and is being used by the person P who is being trained.

These devices are commercially-available fire extinguishers that have been modified in a manner explained below.

They are physically incapable of projecting a fire-extinguishing agent, but they possess means for simulating the jet of such an agent.

Each fire extinguisher is of a different type.

Thus, for example, one of them may be of the type that is supposed to project a spray of water, which is appropriate for so-called "class A" fires, relating to solid substances such as wood, paper, cardboard, etc.

Another fire extinguisher is, for example, of the type that is supposed to project a multipurpose powder, suitable for class A fires, class B fires (liquids), and in even class C fires (gases).

Another fire extinguisher is supposed to project $CO_2$, which is suitable for fires that are electrical in origin.

Finally, the fourth device can be constituted by a fire hydrant with accessories, commonly referred to in the profession [in France] by the initials RIA, and used in particular with large fires of class A, or with fire-fighting equipment of some other type.

The base of each of these devices is fitted with an electrical contactor which engages in a complementary receptacle formed in the stand, thereby forming a contact operating via an appropriate electronic circuit to provide continuous information on whether one of the devices has been removed from the stand, and if so, which device.

The system for detecting which fire extinguisher has been selected is based on using an on/off analog input card connected to the switches. By way of example, the card can be of the type ML8P or 16ISO from INDUSTRIAL COMPUTER SOURCE.

Each device 4, having no fire-extinguishing substance, is fitted with a traditional striker lever, with a safety pin, and with a hose 41, whose end 5 does not constitute a lance for projecting the fire-extinguishing substance, but a laser pointer suitable for emitting a laser light beam that is infrared and intermittent, i.e. in the form of pulses.

As an indication, the power of the beam is 1 mW and its pulses are emitted at a frequency of 25 per second.

Inside the cylinder constituting the device, there are housed batteries (e.g. 6 V or 12 V batteries), a multivibrator that generates the pulses, and a pointer-control circuit, with electrical connections passing along the hose 41.

Appropriate contactors make it possible to detect when the striker lever and the trigger have been activated, with the control circuit powering the pointer only if the operator has, in succession, removed the pin, actuated the striker, and pulled the trigger.

The lance-like pointer 5 is provided with a trigger similar to that fitted to fire extinguishers, and which constitutes a switch which, when actuated, causes an infrared beam 50 to be emitted, and when released interrupts the beam.

The laser pointer 5 and the optical sensor 3 are component elements of an interactive presentation system of the kind sold under the trademark CYCLOPE CYC 1000 by the American company PROXIMA CORPORATION, said system being described in document U.S. Pat. No. 5,181,015, in particular.

The laser beam 50 emitted by the pointer 5 is located by sensors 3 and is transmitted to the computer associated therewith in the form of mouse instructions.

Because the beam is infrared, it is not visible to the person P, and therefore it does not interfere visually with the images coming from the projector 2.

The system operates on the basis of the screen being previously subdivided into "squares" (invisible to the naked eye) made up of horizontal lines 102 and vertical lines 101, subdividing the area of the screen 11 into a certain number of sensors 100 that are, in fact, rectangular. This calibration provides the sensor with the coordinates of the laser beam on the screen, in the form of mouse coordinates. The sensor 3 is capable at all times of detecting which sector 100' of the surface 11 is receiving the impact of the laser beam 50, and of addressing information concerning the identification of said sector to the computer which drives the system.

The installation is fitted with a set of associated devices 8, e.g. four devices referenced 8A, 8B, 8C, and 8D, and shown diagrammatically in the form of blocks in FIG. 1.

Each of these devices represents a respective "influential" means that is capable of taking up at least two different states, with a change in the state of any of them being capable of having an influence on the way in which a fire that has just started will progress.

The set of devices 8 is directly accessible to the person P, said devices being installed, for example, on a side wall of the practice room.

By way of example:
- 8A is a window that can be opened or closed;
- 8B is an electricity meter provided with a lever for turning off the electricity;
- 8C is a valve for turning off gas; and
- 8D is a system for raising an alarm, e.g. a telephone.

Each device is associated with a sensor, e.g. of the switch kind, suitable for issuing a signal representing its state: "open" or "closed" (for the window); electricity off or electricity on (for the electricity meter), etc.

The system for raising an alarm may optionally be connected to the control unit where a person in charge of training can record a message and can take messages accordingly.

These various sensors are connected to the computer driving the installation.

In front of the screen, on the ground, there is a mat 6 over which the person P performing the exercise moves.

The mat has an array of contacts suitable for generating electrical signals when under load, which signals depend on the location of the load, and are due to localized modification of its electrical resistance. Specifically, the contact mat is selected to provide a signal representative of the distance D of the person P from the front edge of the screen (which corresponds substantially to the screen). The signal may be proportional, for example.

By way of example, the mat can be of the kind commonly used for controlling access to the entrance of premises.

In the vicinity of the screen, there is placed a cold smoke generator 71, e.g. situated close to one of the legs 12, a loudspeaker 73, e.g. fixed to the top of the screen, and a spotlight 72 suitable for producing flashes of light, situated behind the screen, assuming that the surface of the screen is translucent.

The smoke generator is of the kind used in scenic installations.

The system is controlled by a computer 9 which is associated with a hard disk 90 and connected to an image bank 91.

By way of example, the computer can be of the PC type, being a DX 2/66 or PENTIUM model, with a 1 gigabyte hard disk and with 16 megabytes of RAM.

The computer is connected by electric cables to the projector 2, to the sensor 3, to the stand 4, to the mat 6, to the wall devices 8, and to the accessories 71, 72, and 73. These links are represented symbolically in FIG. 1 by lines.

In the PC 9, there are provided a decompression card which receives the video data from the hard disk 90 and which decompresses it in real time, a multimedia card (an overlay card) which receives display data from the PC together with decompressed video images, and which projects them on the screen via the video projector 2, and also a card for interfacing the sensor 3, the sensors associated with the devices 8, and the contactors in the stand 40.

The image database contains a certain number of fire scenes of various origins, in particular in an office or a home, for example, a frying pan fire, a wastepaper basket fire, a car engine fire, a fire in an electrical cabinet, etc.

Each type of scene is available in different sequences depending on whether the fire is put out properly, is treated wrongly, or is not treated at all, i.e. is allowed to progress naturally.

All of these families of images are stored on the hard disk 90 and are reproduced on the screen via the projector 2, being sequenced in a manner that is defined by the computer under the control of specific software, and as a function of the behavior of the person P.

The video films are encoded using the coding standard known as "MJPEG" which enables images of large size to be displayed without the image being degraded.

MJPEG sequences can be decompressed using the following cards:

FPS60 or AVMASTER from FAST; or

DC20 from MIRO.

At the beginning of operation, all of the devices for 4A to 4D are in place on the receiver stand 40.

The person in charge of training, installed at the computer keyboard, selects the type of fire, and causes corresponding images to be projected onto the screen.

The images are substantially lifesize, as made possible because of the large size of the screen.

The trainee P must initially act on one or more of the devices 8A, 8B, 8C, and 8D.

Thus, if the fire is of electrical origin, the trainee must begin by switching off the electricity.

For a fire in furniture, the trainee must begin by closing the window (to cut off incoming fresh air which could stir up the flames).

In all cases an alarm must also be given.

The computer will take account of whether or not these prior actions have (or have not) been performed when it selects images for showing progress of the fire.

Thereafter, the trainee must select the fire-fighting device to be used as a function of the category of fire concerned.

After taking hold of one of these devices, specifically the device 4D in the figure, the trainee takes up a position in front of the screen, at a considerable distance therefrom, undoes the safety pin, operates the striker, pulls the trigger, and aims the pointer 5 at the fire, in other words the screen, selecting zones that appear to require action on a priority basis.

Naturally, the computer knows which device is in use, given information coming from the contactor situated in the stand 4; it knows the logical order for putting the fire-fighting device into operation; finally, it is continuously informed as to the zone of impact 100' and the distance between the person and the screen.

In addition, each type of device is associated with a theoretical emptying time, being the average time for emptying the fire-fighting substance from the device. This time is input into the computer as a parameter, and by measuring the total number of infrared pulses emitted, it can determine the moment at which said time has been reached and the device is supposed to be empty.

On the basis of this data, it selects images from the hard disk 90 that are appropriate for causing the fire to progress accordingly, either towards extinction, or on the contrary becoming worse.

Until the striker has been operated and the trigger pulled, the fire progresses unfavorably, which means that modified images are projected, i.e. images that differ from the "standard" sequence which corresponds to the proper action being taken.

Thereafter, until the fire has been extinguished, the operation continues with standard or modified images being projected depending on whether or not the device is handled properly. Naturally, once the device is empty (total time of utilization reaches a given threshold), the images are modified with progress being unfavorable.

Progress also depends on how the various associated devices 8 are actuated, if at all.

Where appropriate, the computer will also drive the generator 71 to generate cold smoke 700 (non-toxic smoke), and also the loudspeaker 73 to produce noises representative of a fire. The loudspeaker 73 can also be used by the person in charge of training to send messages to trainees.

In some cases, it is also possible to produce flashes by means of the spotlight 72, which flashes constitute additional means for illustrating a fire situation. Similarly, the cold smoke generator and the spotlight may also, and preferably, be actuated spontaneously (not under computer control) by the operator when the situation appears to be appropriate.

Assuming that the person performing the exercise began by giving the alarm, e.g. by telephoning the fire brigade, images showing the arrival of help and the action taken can be displayed after a certain amount of time has elapsed.

The trainee is thus confronted with a situation that is very close to that of a genuine incident.

All of the parameters relating to the actions taken by the trainee during the exercise are recorded by the computer, and can then be output on a printer, for the purpose of analyzing the action taken.

Naturally, if the trainee stops pulling the trigger of the laser pointer, then no light beam 50 is emitted, nor is any data transmitted by the sensor 3. Under such circumstances, the computer assumes that no action is being taken against the fire, so the fire is caused to progress in natural manner.

Such a system can be permanently installed in a room, or it can be mounted on a vehicle, thus enabling personnel to be trained close to their places of work.

Instead of using a video projector, it is possible to use a back projector, e.g. of the MO 1280/2 type from INTELWARE in association with an LCD TFT screen. Under such circumstances, it is nevertheless necessary to transform the video signals (analog signals) into digital signals.

Instead of using a contact mat, various other means performing the same function can be used, in particular opto-electronic cells that can be provided for measuring the distance between the operator and the screen.

Instead of determining the time the device has been in operation by counting the number of intermittent beam pulses that have been emitted, it is possible to use a clock servo-controlled to the trigger being pulled, in which case the beam can be continuous.

Figure 2:
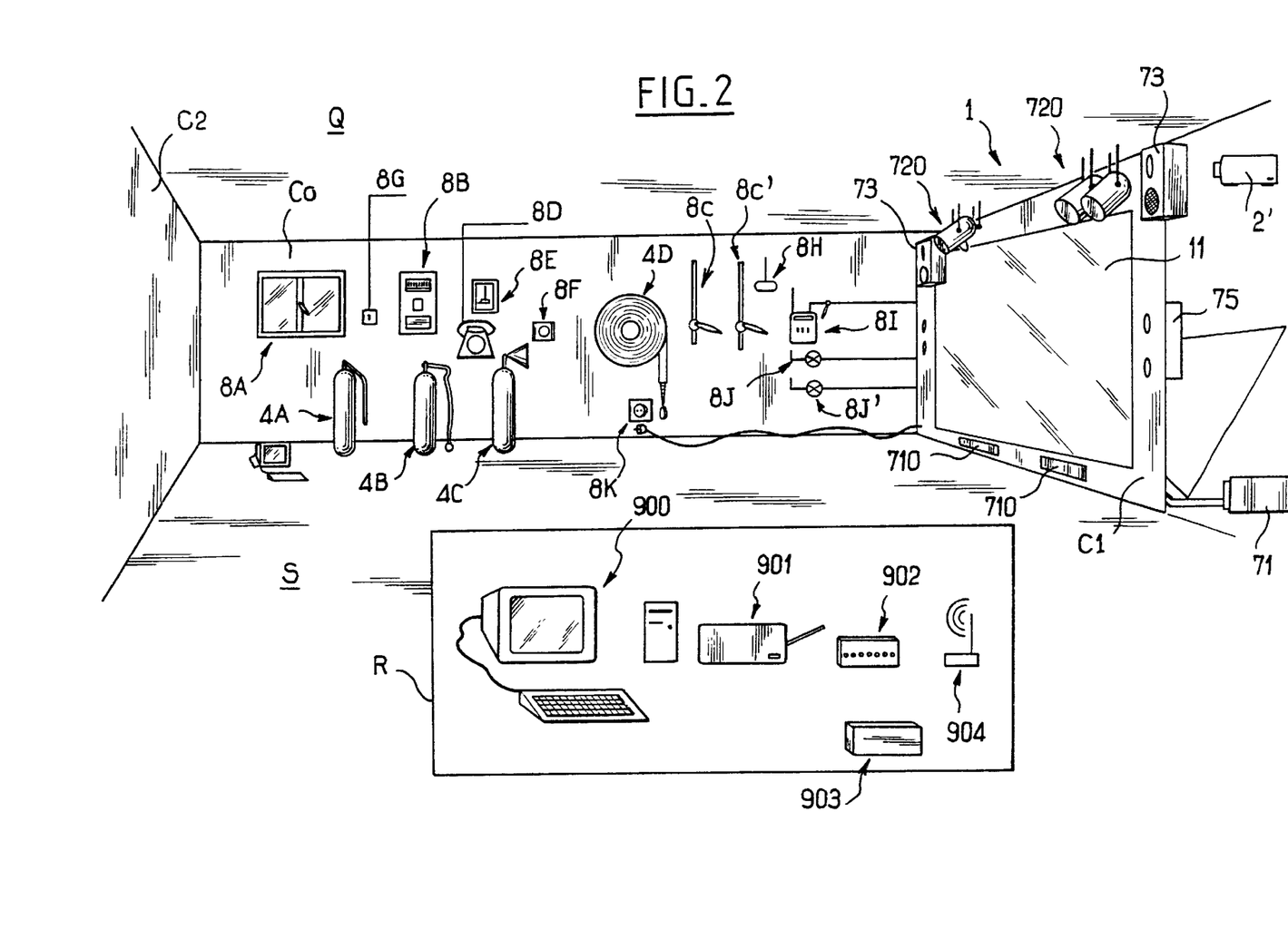
FIG. 2 shows one physical organization for the hardware.

FIG. 2 shows premises capable of receiving an installation of the invention and fitted out exhaustively.

The floor of the premises is referenced S, the ceiling Q, the front wall (receiving the screen) $C_1$, the back wall $C_2$, and a side wall $C_0$.

The control room is referenced R and can be situated in an adjoining room.

This figure shows the various instrumented fire-fighting devices 4, specifically three types of fire extinguisher 4A, 4B, and 4C, together with a fire hydrant 4D, and also the various associated devices 8A to 8K.

Specifically, in addition to the above-mentioned devices 8A, 8B, 8C, and 8D, there is a glass breaker 8E, an emergency stop button 8F, a switch 8G, a trapdoor-pull system 8H (controlling smoke removal), a gas meter 8I, a pair of valves for switching off the arrival of liquids 8J and 8J', and an electrical outlet 8K.

There are two valves for switching off gas 8C and 8C'.

In this figure, the video projector, referenced 2', is placed behind the screen 1' and works by back projection, the surface of the screen 11 being translucent.

There can be seen loudspeakers 73, and a smoke generating system 71 that is likewise placed behind the screen.

This produces cold smoke that comes out through the base of the screen via openings 710. Spotlights 720 are installed at the top of the screen suitable for projecting lights. Reference 75 designates a diffuser of odiferous substances, suitable for emitting odors relating to the kind of fire (e.g. gas odors), thereby increasing the realism of the simulation. The diffuser 75 can also be controlled by the computer and/or controlled directly from the control room.

Beside the stereo tape for the projected video images, it is possible to provide for the addition of digital sounds corresponding to handling of the fire-fighting means (fire extinguisher noises, valves closing, etc.) which are emitted by the loudspeakers 73.

In the control room R there can be seen a computer screen and controlling keyboard 900, a printer 901, an I/O processing system 902, a localizing system 903, and a high frequency receiver 904.

In this embodiment, the connections between the sensors associated with the fire-extinguisher devices 4 and the associated devices 8 are implemented by radio links, not by wire links.

Figure 3:
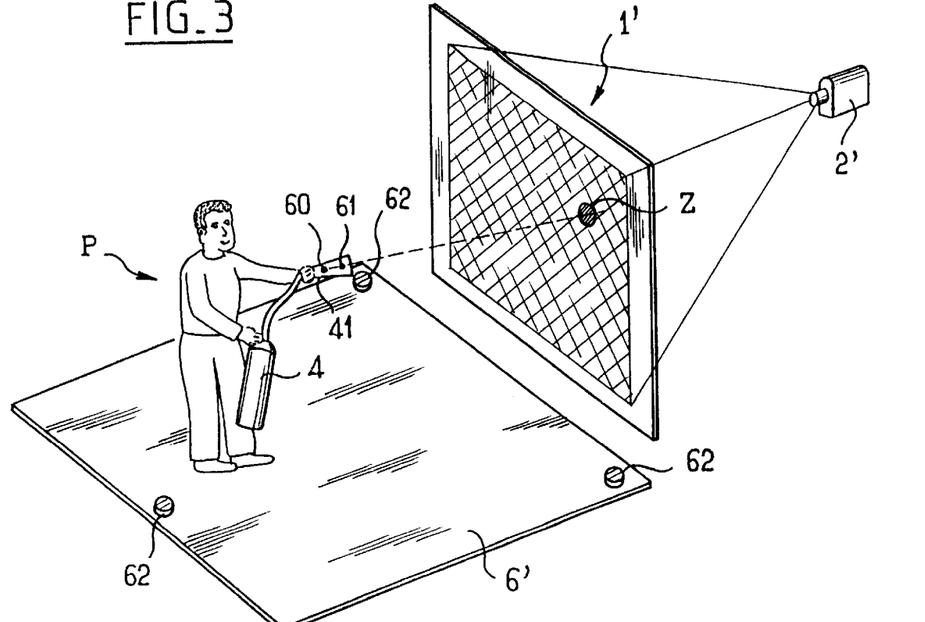
FIG. 3 is a simplified overall view, analogous to FIG. 1 and showing a second embodiment.

With reference to FIG. 3, an embodiment of the installation is described in which the virtual impact of the fire extinguisher device on the screen 1 is located by an electromagnetic detection system.

The system implemented is preferably the model sold by the American company POLHEMUS under the commercial name "FASTRACK". The principle on which the system operates is described in documents EP-A-0 581 534 and EP-A-0 620 448, for example, and comprises a set of magnetic field generators (emitters) associated with a set of field detectors (sensors), one of the sets being stationary and the other moving. The measurements made by the sensors are a function of the orientation and the relative positions of the two assemblies. The result of the measurements, after computation and processing by the computer, enable the moving assembly to be accurately located with six degrees of freedom relative to a fixed coordinate system.

In the drawing of FIG. 3, the instrumented fire extinguisher device 4 is fitted with one of the two electromagnetic field generators 60, 61. These are in alignment on the theoretical direction of the jet (the aiming axis) as represented by dashed lines. A set of three sensors 62 is fixed to the ground, in a triangular disposition, and in positions that are determined relative to the screen 1'.

When the device 4 is actuated by the person P, the elements 60 and 61 create magnetic fields which are detected by the sensors 62 that provide the computer with the positions of the elements 60 and 61 in real time. The computer then computes the position of the impact zone Z of the virtual jet on the screen, the angle of attack, and the distance of attack (distance between the diffusing head and the screen).

These parameters are taken into account for controlling the fire images projected by the video projector 2' onto the screen 1'.

The projector is selected to avoid degrading the quality of a video image in a standard format (e.g. PAL). By way of example, mention can be made of the projector distributed under the reference ASTROBEAM 800×600 LCD by DAVIS.

Figure 5:
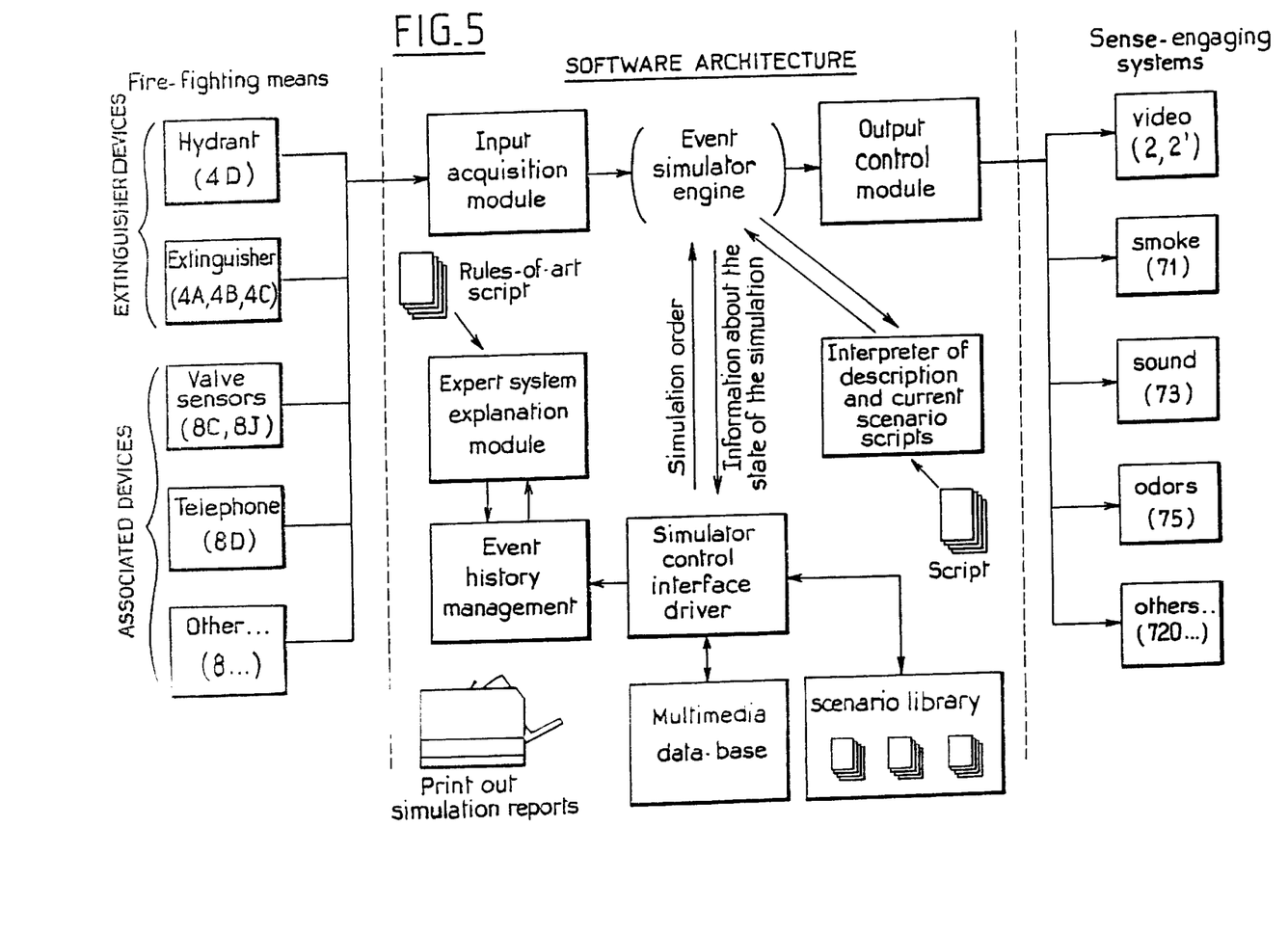
FIG. 5 is a diagram of the software architecture of the computer processor unit driving the installation.

Reference is now made to FIG. 5 in which there can be seen the software architecture of the computer processor unit.

The dynamics of the system rely on an engine for simulating discrete events.

This engine is responsible for controlling sense-engaging devices: video images, sound, emission of lights, smoke, odors, etc.

The software architecture comprises the following elements:

a control and driver module;

an interpreter of descriptive scripts and video clip scenarios;

an environment simulation engine;

an input acquisition module;

an output control module;

a multimedia database;

event history management; and an explanation module.

The control and driver module is responsible for the user interface, for changing scenario, for simulation commands, and for printing simulation reports.

The script interpreter interprets the facts, declarations, and commands given in a "scenario" script and in a "video clip" script. The entire dynamic behavior of a scenario is described in these scripts.

The simulation engine is a multiagent system, responsible for communication between the agents, for transferring events to the agents concerned, for sending commands to the sense-engaging systems, and requests to the scenario interpreter module.

The function of the input acquisition module is to acquire any change of state of the fire-fighting means in real time.

The output control module is an interface for controlling the various sense-engaging systems.

The multimedia database is a file in which images and sounds are stored. As an indication, this data may occupy a volume of about 60 Mbytes per scenario.

Significant events passing through the simulation core are stored in the module for managing event history for subsequent use by the explanation module. The information stored includes actions made by the user, details of switchovers, commands given to the sense-engaging systems.

At the end of a simulation session, the explanation module applies rules of the "art" on the facts contained in the historical record, and generates an explanatory report concerning the final situation, and also proposes palliatives.

Thus, for example, in an office fire scenario, it can be seen that because of the presence of a strong draft the fire has propagated in spite of a sufficient quantity of fire-extinguishing agent being applied. Under such circumstances, the palliative consists in closing air inlets before applying the fire-extinguishing agent.

As an example of a scenario, we now analyze that of a fire started by sparks from a grinder.

The exercise applies to a person working in an industrial environment, for example a maintenance workshop fitted with a vice, a drill, and an electric grinder.

The fire-extinguishing means made available to the trainee are $CO_2$, powder, and water fire-extinguishers.

The associated devices concerned are a power outlet (to disconnect the grinder) and an electricity meter.

The causes of the fire are associated with a portable grinder being used wrongly (grinding in the wrong direction), causing sparks to be sent towards a pile of oily rays present in the premises. Because of the smoke given off and the rags taking fire, the surprised operator has put down the grinder without turning it off.

The correct actions to be taken are firstly to turn off the grinder by disconnecting it or by switching off at the meter, and then to use the water fire extinguisher which is the appropriate device under the circumstances. $CO_2$ is ineffective on live embers and gives rise to temporary extinction followed by the fire taking hold again. Powder disperses the pile of rags and gives rise to a large cloud.

This scenario can be broken down into a set of subsequences or "video clips" as set out in the table below:

| Cause | The worker at a workstation makes use of a grinder, the rags catch fire, the worker then leaves the workstation quickly without disconnecting the grinder. |
|---|---|
| Combustion | The grinder is turning. The rags are burning. The flames are growing. |
| Disconnecting the grinder | The grinder stops. |
| Using water | The fire is put out. |
| Using $CO_2$ | Ineffective on glowing embers. The fire starts up again. |
| Using powder | The pile of rags is dispersed. A large cloud is produced. |

Once the above "general story-board" has been produced, a more detailed description applies to each video clip, specifying certain technical aspects such as line of sight, illumination, the equipment required, and the angles from which filming should be performed.

Figure 4:
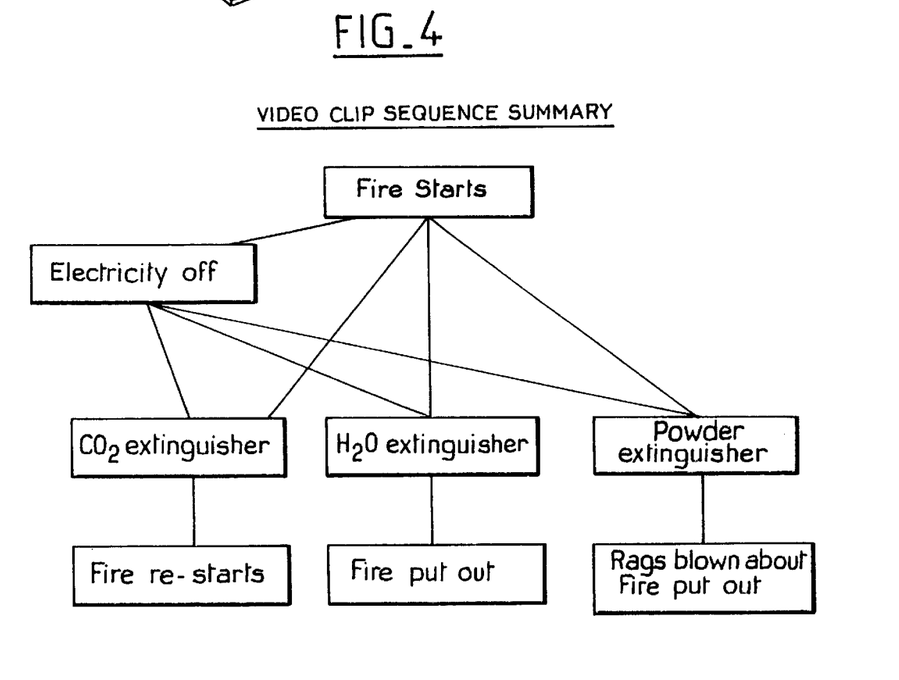
FIGS. 4 and 6 are tables showing two summaries of video sequencing for two different example fires, respectively a fire started by a grinder and a fire in cardboard boxes.

FIG. 4 summarizes how the video clips are sequenced. Each rectangle constitutes a particular clip. Switching from one clip to another is triggered by an event. The sequencing summary can be used for preparing the various scenes that need to be filmed.

These scenes are filmed in a studio that reproduces a maintenance workshop, in which real fires are lighted to correspond to the various video clips.

After analog de-rushing, compression, description of video attributes and of sense-engaging commands, tests and adjustments of progress in the video clip, the images retained are stored in the multimedia database of the system.

Figure 6:
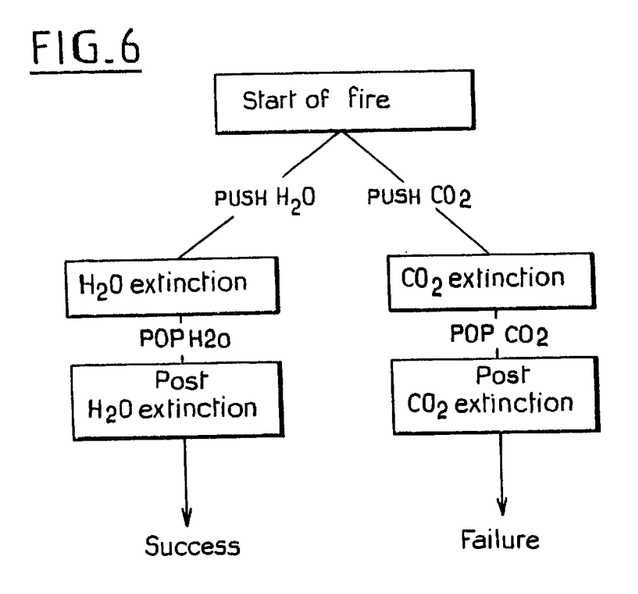

FIG. 6 is a diagram summarizing the sequencing of video clips in a scenario relating to a fire in a pile of boxes inside an office.

Two fire extinguishers (water and $CO_2$) are present in the vicinity. The appropriate fire-extinguishing agent is water. The use of $CO_2$ leads to the flames restarting.

The various possible paths of the scenario are shown diagrammatically in the summary.

Such a scenario can be broken down into five video clips, as shown in the table below.

| Name | Trigger event | Description |
|---|---|---|
| Start of scenario | Boxes burning, fire getting bigger. | Start of fire. |
| PUSH $H_2O$ | Flames disappear. | Water extinction. |
| POP $H_2O$ | Fire out, boxes soaked. | Post water extinction. |
| PUSH $CO_2$ | Flames disappear, but embers remain. | $CO_2$ extinction. |
| POP $CO_2$ | Embers cause fire to restart. | Post $CO_2$ extinction. Fire restarts. |

Figure 7:
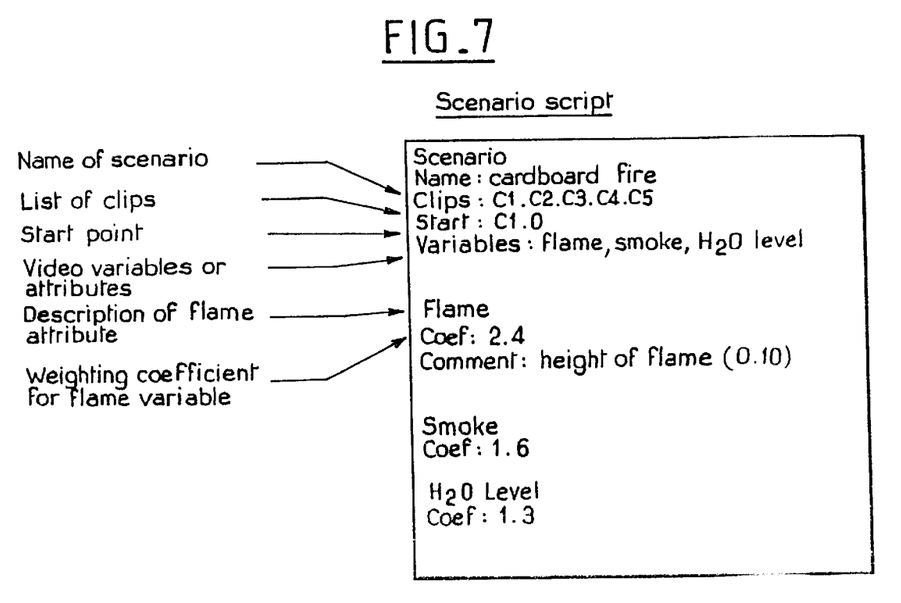
FIGS. 7 and 8 are respective computer language representations of a scenario script and of a video clip script.

The script of the above scenario in computer language is given in FIG. 7.

With reference thereto, the following observations should be made:

The variables of a scenario are elements that vary from one video clip to another.

The size of the flames is characterized, for example, by the "flame" variable.

Flame=0 means that there is no flame. Flame=10 represents a large flame.

The variables in this scenario are flame size, smoke level, and extent of water on the ground.

The scenario script declares these variables describing the video image, thus enabling them to be used in the scripts for the video clips.

The "start" zone of the scenario script specifies the video clip and the frame number to be played when starting the scenario.

Figure 8:
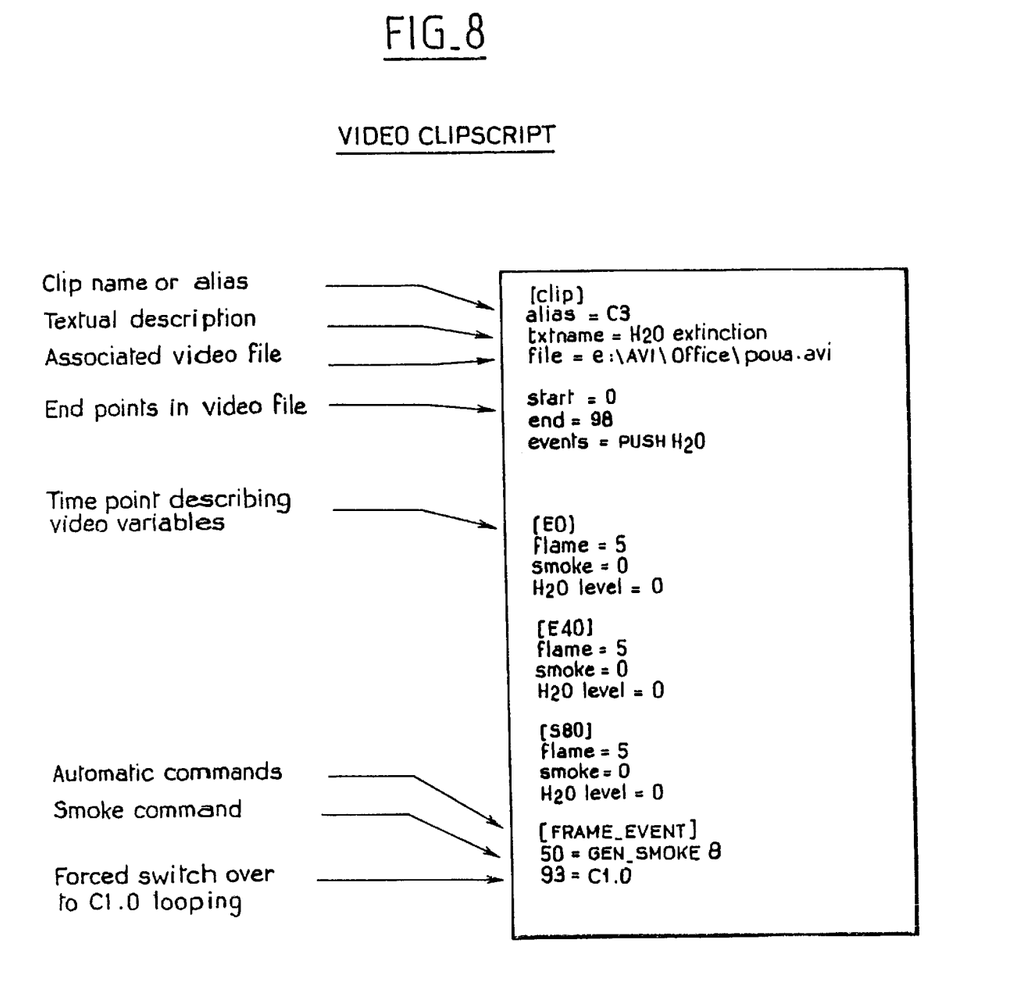

The video clip scenario is given in FIG. 8.

Each video clip is associated with a script, with the elements thereof appearing in the diagram.

The "alias" zone names the clip. The alias is used in particular during automatic operation.

$C_1 0$ means: "Play clip $C_1$, starting at frame No. 0".

The text description zone serves to feed the history management module.

The zones "file, start, end" associate the clip with a digital video file.

Clip $C_1$ corresponds to frame numbers in the zone [0 . . . 98] in the digital video file e: \AVI\Office\poua.avi.

It should be observed that a plurality of video clips can all refer to the same digital file.

The zone [E0] is a time description point of the scene corresponding to frame No. 0 in this clip. The video variants are allocated. The simulator knows the state of the video scene at this point.

The system for deciding to change from one scene to another makes use of these description points for selecting an appropriate video scene.

The zone [FRAME_EVENT] describes the commands to be performed at the frame numbers mentioned.

At video point $C_2.50$ a level 8 smoke command is issued.

At video 93, a switchover to video point $C_1.0$ is performed.

These commands serve to switch on projectors, to trigger an alarm, to diffuse odors, or to switch from one sequence to another.

The zone [event] describes all of the events that have the potential of triggering a switchover to video clip $C_3$.

The clip $C_3$ will allow itself to be played following a PUSH $H_2O$ event: the user has actuated the $H_2O$ fire extinguisher.

The script of a scenario declares the time events that are description points of the video clip. For example: $C_3$ declares that at the point corresponding to frame No. 40 flame=5, smoke=0, and water=3.

The script of a scenario is also a file of time commands.

Example: at video point $C_2.50$, a level 8 smoke command is issued.

What is claimed is:

1. A teaching installation for training and practice in the use of fire-fighting equipment, the teaching installation comprising:

a screen (1) in front of which the person (P) performing the exercise is to be located;

means for displaying on the screen (1) varying images that represent a fire in a sequence that is driven by a computer (9);

at least one modified fire extinguisher device (4) that is incapable of propelling a fire-extinguishing agent, but that is fitted with means for generating a signal representing the direction of its virtual jet; and means for locating the virtual zone of impact of the device (4) on the screen (1), and adapted to transmit corresponding information to the computer (9) so as to cause the displayed images to vary accordingly;

the installation being characterized by the fact that:
  a) said screen (1) is of large dimensions, such that the images displayed thereon are at the same scale as real fire scenes they represent; and
  b) the installation includes:
    at least one associated device (8) representing influential means that can be put into at least two different states, and for which a change of state can have an influence on the progress of the fire, said associated device also being adapted to be actuated by the person (P) performing the exercise, means for detecting the state of said associated device being provided and adapted to transmit corresponding information to the computer (9) so as to cause the displayed images to vary accordingly, where appropriate; and
    a plurality of modified fire extinguisher devices (4A, 4B, 4C, 4D) of different types, suitable for being taken selectively by the person (P), contactors associated with each of said devices being adapted to supply the computer (9) with information concerning the identity and the state of the device that has been taken,
  wherein the impact zone is located by an electromagnetic detection system, the modified fire extinguisher device (4) being fitted with emitting cells located on the aiming axis of the device, while fixed magnetic field sensors are distributed in the exercise zone, said system detecting both the distance and the angle of attack of the fire extinguisher device (4) relative to the screen.

2. A teaching installation for training and practice in the use of fire-fighting equipment, the teaching installation comprising:
  a screen (1) in front of which the person (P) performing the exercise is to be located;
  means for displaying on the screen (1) varying images that represent a fire in a sequence that is driven by a computer (9);
  at least one modified fire extinguisher device (4) that is incapable of propelling a fire-extinguishing agent, but that is fitted with means for generating a signal representing the direction of its virtual jet; and
  means for locating the virtual zone of impact of the device (4) on the screen (1), and adapted to transmit corresponding information to the computer (9) so as to cause the displayed images to vary accordingly;
  the installation being characterized by the fact that:
    a) said screen (1) is of large dimensions, such that the images displayed thereon are at the same scale as real fire scenes they represent; and
    b) the installation includes:
      at least one associated device (8) representing influential means that can be put into at least two different states, and for which a change of state can have an influence on the progress of the fire, said associated device also being adapted to be actuated by the person (P) performing the exercise, means for detecting the state of said associated device being provided and adapted to transmit corresponding information to the computer (9) so as to cause the displayed images to vary accordingly, where appropriate; and
      a plurality of modified fire extinguisher devices (4A, 4B, 4C, 4D) of different types, suitable for being taken selectively by the person (P), contactors associated with each of said devices being adapted to supply the computer (9) with information concerning the identity and the state of the device that has been taken,
  wherein the impact zone is located by means of an infrared light beam, emitted by a laser pointer (5) fitted to the modified fire extinguisher device (4), and by means of an optical sensor (3) suitable for locating the impact zone (100') of the beam (50) on the surface of the screen (11),
  and wherein said laser pointer (5) emits an intermittent beam, in the form of pulses, the optical sensor (3) being adapted to analyze the duration of said pulses, and to transmit corresponding information to the computer (8).

3. The teaching installation of claim 2, wherein said associated device (8) represents "influential" means selected from the following:
  an alarm;
  a glass breaker;
  a telephone;
  an electrical control panel;
  a gas meter;
  an oxygen cutoff handle;
  a machine switchoff handle;
  an electricity outlet;
  an extinguishing gas control; and
  a trapdoor-pull device.

4. A teaching installation for training and practice in the use of fire-fighting equipment, the teaching installation comprising:
  a screen (1) in front of which the person (P) performing the exercise is to be located;
  means for displaying on the screen (1) varying images that represent a fire in a sequence that is driven by a computer (9);
  at least one modified fire extinguisher device (4) that is incapable of propelling a fire-extinguishing agent, but that is fitted with means for generating a signal representing the direction of its virtual jet; and
  means for locating the virtual zone of impact of the device (4) on the screen (1), and adapted to transmit corresponding information to the computer (9) so as to cause the displayed images to vary accordingly;
  the installation being characterized by the fact that:
    a) said screen (1) is of large dimensions, such that the images displayed thereon are at the same scale as real fire scenes they represent; and
    b) the installation includes:
      at least one associated device (8) representing influential means that can be put into at least two different states, and for which a change of state can have an influence on the progress of the fire, said associated device also being adapted to be actuated by the person (P) performing the exercise, means for detecting the state of said associated device being provided and adapted to transmit corresponding information to the computer (9) so as to cause the displayed images to vary accordingly, where appropriate;
      a plurality of modified fire extinguisher devices (4A, 4B, 4C, 4D) of different types, suitable for being taken selectively by the person (P), contactors associated with each of said devices being adapted to supply the computer (9) with information concerning the identity and the state of the device that has been taken, and means for generating at least one of flashes of light, sounds, cold smoke and odors c) wherein the impact zone is located by means of an infrared light beam (50), emitted by a laser pointer (5) fitted to the modified fire extinguisher device (4), and by means of an optical sensor (3) suitable for locating the impact zone (100') of the beam (50) on the surface of the screen (11), wherein said laser pointer emits an intermittent beam, in the form of pulses, the optical sensor (3) being adapted to analyze the duration of said pulses, and to transmit corresponding information to the computer (8).

5. A teaching installation for training and practice in the use of fire-fighting equipment, the teaching installation comprising:

a screen (1) in front of which the person (P) performing the exercise is to be located;

means for displaying on the screen (1) varying images that represent a fire in a sequence that is driven by a computer (9);

at least one modified fire extinguisher device (4) that is incapable of propelling a fire-extinguishing agent, but that is fitted with means for generating a signal representing the direction of its virtual jet; and means for locating the virtual zone of impact of the device (4) on the screen (1), and adapted to transmit corresponding information to the computer (9) so as to cause the displayed images to vary accordingly;

the installation being characterized by the fact that:

a) said screen (1) is of large dimensions, such that the images displayed thereon are at the same scale as real fire scenes they represent; and b) the installation includes:

at least one associated device (8) representing influential means that can be put into at least two different states, and for which a change of state can have an influence on the progress of the fire, said associated device also being adapted to be actuated by the person (P) performing the exercise, means for detecting the state of said associated device being provided and adapted to transmit corresponding information to the computer (9) so as to cause the displayed images to vary accordingly, where appropriate; and a plurality of modified fire extinguisher devices (4A, 4B, 4C, 4D) of different types, suitable for being taken selectively by the person (P), contactors associated with each of said devices being adapted to supply the computer (9) with information concerning the identity and the state of the device that has been taken, c) wherein said associated device (8) represents "influential" means selected from the following:
an alarm;
a glass breaker;
a telephone;
an electrical control panel;
a gas meter;
an oxygen cutoff handle;
a machine switchoff handle;
an electricity outlet;
an extinguishing gas control; and
a trapdoor-pull device.

6. A simulator for training a person in the use of fire-fighting equipment, the simulator comprising:

a screen (1) having a surface area that is sufficient to display an actual-size fire situation;

a video projector (2) including means for projecting the fire situation and the evolution of the fire situation as displayed images on the screen (1);

an optical sensor (3) coupled to the video projector (2) through a computer (9), the optical sensor (3) including means for receiving signals from the direction of the screen (1) as a received signal and means for transmitting the received signal to the computer (9) so as to cause the displayed images to vary as a function of the received signal;

at least two fire extinguisher devices (4), wherein each device (4) is incapable of propelling a fire-extinguishing agent jet, each device (4) is fitted with means for generating a signal that represents a virtual fire-extinguishing agent jet, each device (4) individually is coupled to the computer (9) for the transfer of information, and each device (4) includes information concerning the identity and the location of the device (4); and at least one associated device (8) coupled to the computer (9), the at least one associated device (8) including at least two different states and means for transmitting a state to the computer (9) so as to cause the displayed images to vary as a function of the state of the at least one associated device (8), wherein the at least one associated device (8) is selected from the following: an alarm; a glass breaker; a telephone; an electrical control panel; a gas meter; an oxygen cutoff handle; a machine switchoff handle; an electricity outlet; an extinguishing gas control; and a trapdoor-pull device.

7. The teaching installation of claim 4, wherein the means for generating at least one of flashes of light, sounds, cold smoke and odors is under the control of the computer (8).

* * * * *

UNITED STATES PATENT AND TRADEMARK OFFICE
CERTIFICATE OF CORRECTION

PATENT NO. : 6,129,552
DATED : October 10, 2000
INVENTOR(S) : Deshoux et al.

Page 1 of 1

It is certified that error appears in the above-identified patent and that said Letters Patent is hereby corrected as shown below:

Title page,
In *Attorney, Agent, or Firm*, please delete "Blakley" and insert -- Blakely --.

Column 15,
Line 4, after "odors", please insert -- ; and --.
Line 54, please delete "," and insert -- ; --.

Signed and Sealed this

Eighteenth Day of December, 2001

Attest:

JAMES E. ROGAN
*Director of the United States Patent and Trademark Office*

*Attesting Officer*